United States Patent [19]
Martin

[11] Patent Number: 6,065,467
[45] Date of Patent: May 23, 2000

[54] FIREPLACE-BARBECUE WITH HEAT EXCHANGER

[76] Inventor: Ed Martin, 2427 Beta Avenue, Burnaby, British Columbia, Canada, V5C 5N1

[21] Appl. No.: 09/295,981

[22] Filed: Apr. 21, 1999

Related U.S. Application Data

[63] Continuation-in-part of application No. 09/229,548, Jan. 13, 1999.

[51] Int. Cl.[7] .................................................. F24C 3/00
[52] U.S. Cl. ...................... 126/41 R; 126/100; 126/521
[58] Field of Search .................................. 126/41 R, 521, 126/522, 100

[56] References Cited

U.S. PATENT DOCUMENTS

| | | | |
|---|---|---|---|
| 4,008,707 | 2/1977 | Bartlett | 126/521 |
| 4,074,681 | 2/1978 | Whiteley | 126/521 |
| 4,217,094 | 8/1980 | Crowley | 126/521 |

FOREIGN PATENT DOCUMENTS

| | | | |
|---|---|---|---|
| 1279540 | 1/1991 | Canada . | |
| 1300994 | 5/1992 | Canada | F24B 3/00 |
| 1300995 | 5/1992 | Canada | F24B 3/00 |

*Primary Examiner*—Carroll Dority
*Attorney, Agent, or Firm*—Michael Best & Friedrich LLP

[57] ABSTRACT

A combination portable gas barbecue and portable simulation fireplace includes a cooking vessel having imitation fireplace logs and a gas burner mounted on a lift-out log grate. A window is mounted in the front of the cooking vessel to allow direct viewing of the imitation logs and flames and of the underside of the food being cooked. Air inlet and outlets cause convection currents to flow away from the viewing window and out side vents formed by gaps between an oversized hood and the cooking vessel. An air convection system is set up by providing an air inlet below the window and outlet air gaps between the hood and the cooking vessel. A deflector is provided over the viewing window to prevent grease drippings from soiling the window or falling into the air inlet. A removable heat exchanger heats up air by contact with the walls of the cooking vessel and directs the resulting warm air to the front of the cooking vessel.

6 Claims, 5 Drawing Sheets

FIREPLACE-BARBECUE WITH HEAT EXCHANGER

TYPE OF APPLICATION

This is a continuation-in-part of application Ser. No. 09/229,548 filed Jan. 13, 1999.

TECHNICAL FIELD OF THE INVENTION

This invention relates to gas barbecues. In particular this invention relates to a portable gas barbecue which includes a simulated wood fireplace for viewing pleasure and to act as a heat and light source.

BACKGROUND OF THE INVENTION

Outdoor portable metal gas barbecues with lift-up metal hoods have become very popular.

These portable barbecues usually consist of a generally rectangular cart having a pair of stationary supports on one end and a pair of wheels on the other end, a fixed cooking vessel and lift-up hood. Near the bottom level of the cooking vessel there is provided a gas burner consisting of a tube with a plurality of burner ports along the underside of the tube. In some cases, the burner ports are positioned along the top of the tube and are protected from falling grease or food particles by inverted V-shaped deflectors fixed above the burner ports. A portable fuel tank such as propane can be supported on the cart or a quick disconnect hose system may be used to supply other gases such as natural gas from a fixed source. Above the gas burner a grid structure usually supports a heat absorbing and distributing material such as lava rock or variously-shaped ceramic briquettes. In use, these materials sometimes absorb and accumulate grease drippings until they ignite into uncontrolled flare-ups. This is a problem as flare-ups tend to burn or overcook the food in the area of the flare-up and such condition is usually not visible unless the food is turned over. A cooking grid is usually positioned above the heat absorbing materials.

Another problem that confronts many apartment dwellers who may enjoy barbecuing are restrictions on the use of outdoor balconies for cooking purposes because of the drifting smoke or fumes that can offend neighbours. These same apartment dwellers often do not have the luxury and ambiance of an indoor fireplace.

Many of these outdoor portable hooded barbecues include a high heat resistant window in the front of the lift-up hood to allow the user to look down onto the cooking food. However, a problem with such windows is that they invariably become obscured by the build up of carbon, vaporization, tar and smoke. This forces the user to undertake repeated and vigorous cleaning if the user wishes to continue using the window.

Another of the problems with the aforesaid type of barbecues is the high heat that is usually generated and the resulting high cost of the fuel employed to obtain only the benefit of cooking over flame.

A related trend in outdoor lifestyles is the use of electric or gas decorative patio heaters and gas campfires with simulated firewood made of concrete and fibrous materials. These provide a comfortable, versatile ambiance of warmth, light and flame in an outdoor setting.

It is therefore a general object of the present invention to combine the pleasing aspects of the sight, warmth and light of a simulated fireplace with the functionality of a portable gas barbecue grill.

Another object of this invention is to provide a fireplace-barbecue that can be equipped to be monoxide safe for indoor use and will not foul the interior air.

It is a further object of the invention to provide a viewing window in the cooking vessel allowing the user to view the burning of the simulated fireplace, and to provide means for keeping the viewing window relatively clean as compared to prior art barbecue viewing windows.

It is a further object of the invention to provide such a viewing window which allows the user to view the underside of the food as it cooks.

Another object of the invention is to provide a grill refractory material in the shape of simulated logs, twigs, coals or similar objects which are visible when the hood of the barbecue is closed. It is a further object to provide such refractory which has minimal absorption of greases, which has sufficiently high heat absorption to vaporize grease drippings into a multi-coloured flame, and which presents a fiery ember glow when subjected to flame so as to produce a realistic simulation of a wood fireplace.

Another object of the invention is to provide such a gas fireplace-barbecue which is easy to assemble or clean with a minimum of instruction and without the use of any specialty tools.

Other more specific objects of the invention will be appreciated by reference to the following disclosure.

SUMMARY OF THE INVENTION

According to the present invention, grid supported lava rock, ceramic briquettes and other similar materials usually present in a gas barbecue are replaced with decorative molded refractory imitation fireplace logs and twigs or coals and other objects arranged in a simulated burning fireplace which can be viewed through a viewing window formed in a side wall of the cooking vessel so as to allow direct side viewing of the refractory and flame. The viewing window is arranged so as to be lower than the cooking grill so as to allow the user to see the underside of the food while it cooks.

In one aspect of the invention, a removable heat exchanger comprises spaced walls defining at least one chamber, and retaining means for removably securing the heat exchanger to the outside walls of the cooking vessel. The walls of the heat exchanger are configured such that when the heat exchanger is mounted on the walls of the cooking vessel, the inner walls of the heat exchanger are substantially in contact with the walls of the cooking vessel. The heat exchanger includes an air inlet and a motor driven fan for directing warmed air through openings in the chamber towards the front of the cooking vessel. Retaining means are provided on the inner walls of the heat exchanger for mounting it against the side walls of the cooking vessel.

In a further of its aspects, the invention consists of a portable gas barbecue comprising a cooking vessel having a floor and walls extending upwardly from said floor, a gas burner and refractory disposed in the cooking vessel above its floor, a viewing window located in one of the walls and at substantially the same height above the floor as the refractory whereby to allow substantially direct lateral viewing of the refractory during operation of the barbecue, and a removable heat exchanger comprising a plurality of inner and outer walls defining at least one chamber between them. The chamber includes at least one opening toward the front of the cooking vessel. A fan is located within the chamber. An air inlet is provided in the exchanger. Retaining means are provided for selectively mounting the heat exchanger on the cooking vessel walls and the inner walls of the heat exchanger are configured such that when the heat exchanger is mounted on said cooking vessel walls, the inner walls of the heat exchanger are substantially in contact with the cooking vessel walls.

Other features of the invention will be apparent from the detailed description and claims which follow.

DETAILED DESCRIPTION OF BEST MODE AND PREFERRED EMBODIMENT OF THE INVENTION

Figure 1:
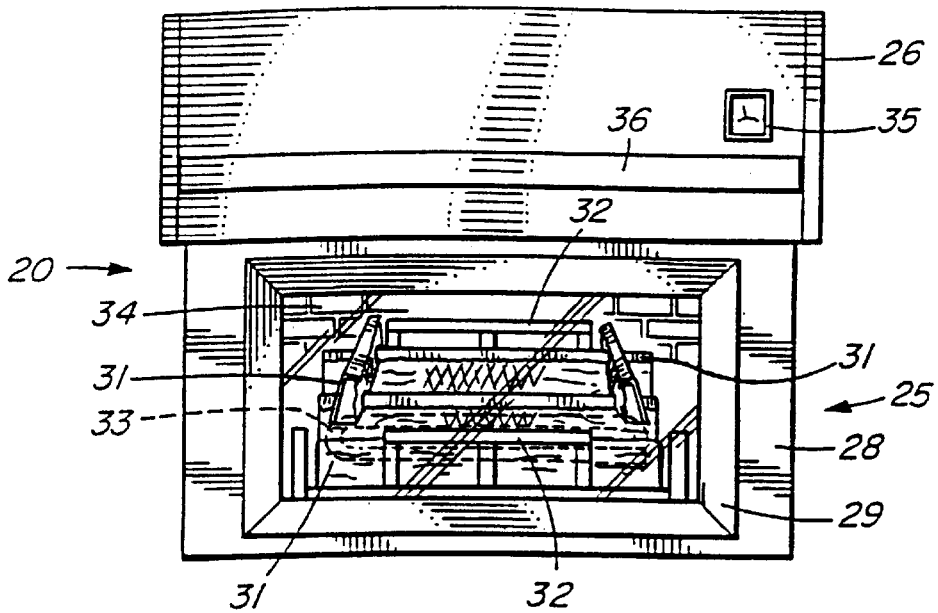
FIG. 1 is a front view of the cooking vessel and hood of a gas fireplace-barbecue according to the invention.

While this invention is susceptible to embodiments in many different forms, there is shown in the drawings and will herein be described in detail preferred embodiments of the invention with the understanding that the present disclosure is to be considered as an exemplification of the principles of the invention and is not intended to limit the broad aspects of the invention to the embodiments illustrated.

FIG. 1 of the drawings illustrates a gas fireplace-barbecue generally designated by reference numeral 20, constructed in accordance with the teachings of the present invention. It comprises a cooking vessel 25 and a lift-up hood 26 pivoted on hinges at the rear of the cooking vessel as is common in portable barbecues. The cooking vessel 25 and the hood 26 are preferably formed of heavy sixteen gauge powder coated or enameled steel or broader-walled (and lighter) cast aluminum.

Figure 2:
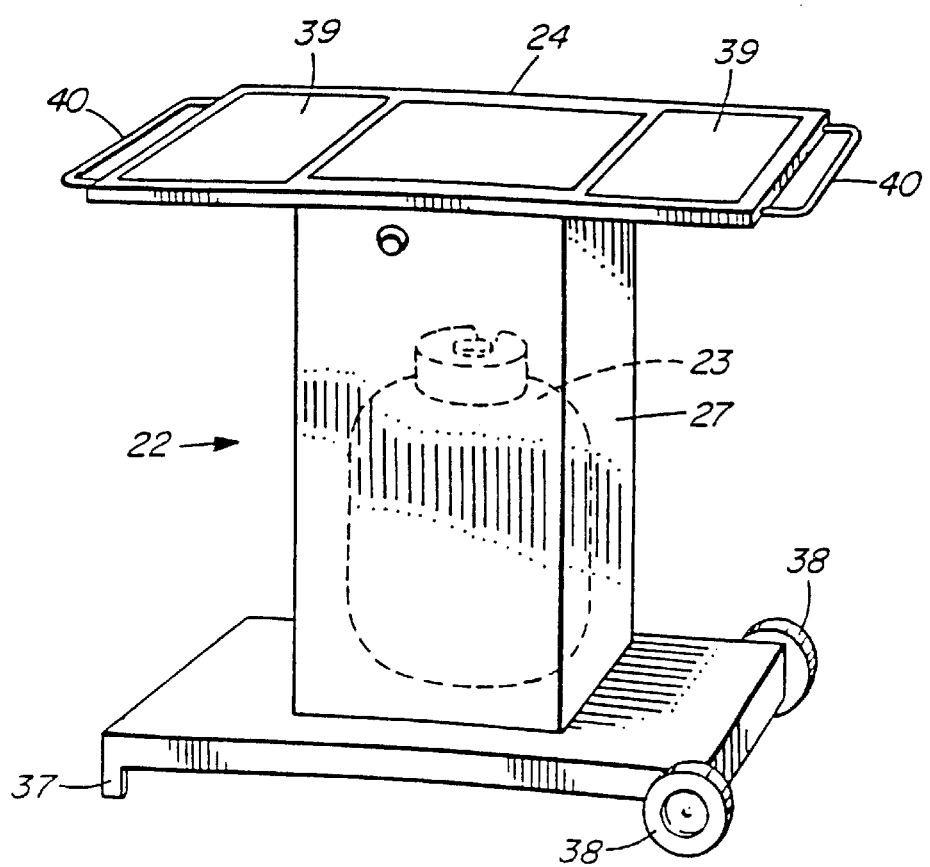
FIG. 2 is a perspective view of a stove type pedestal cart for use with the invention.
Figure 3:
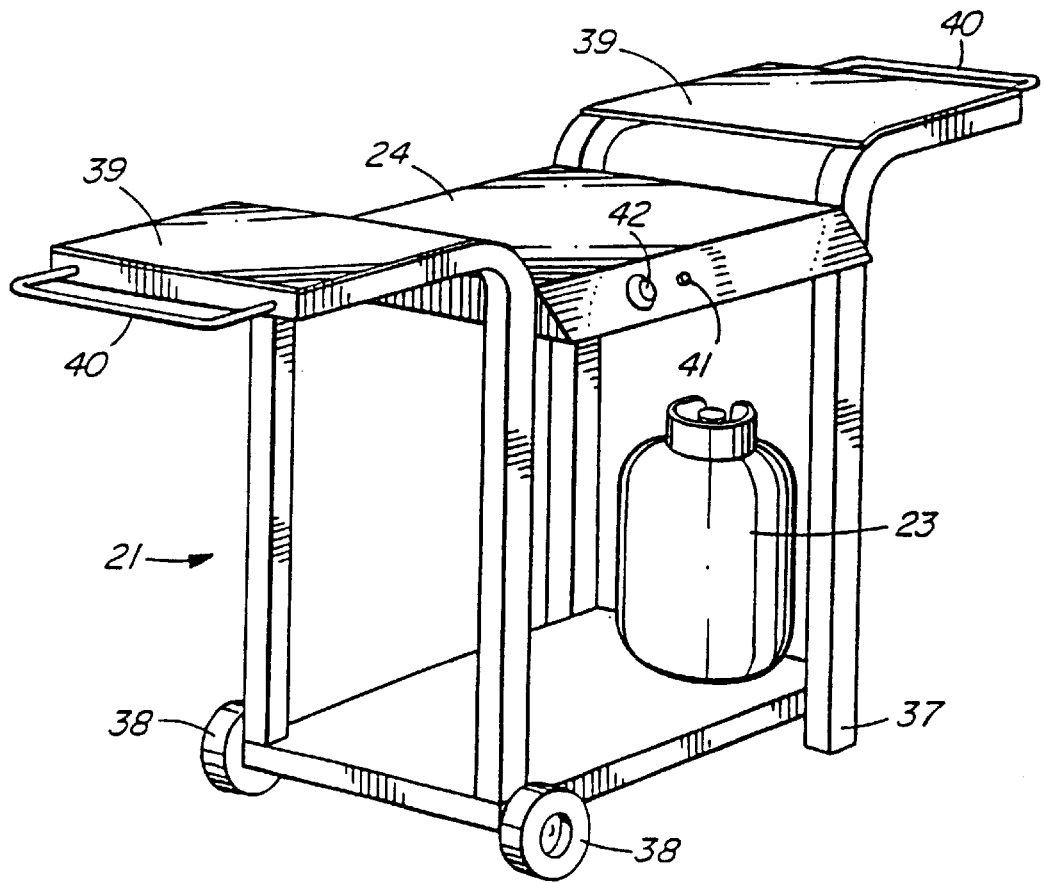
FIG. 3 is a perspective view of a tray type cart for use with the invention.

The fireplace-barbecue 20 can be seated within the framework 24 of a portable free-standing stove style model 22 with its secured fuel tank 23 concealed within its pedestal base 27 or on a cart 21, shown in FIGS. 2 and 3. Both the cart 21 and stove-style model 22 include a pair of vertical posts 37 on one end for stationary stability and a pair of wheels 38 on the other end for mobility. The upper portion of the cart 21 and stove-style model 22 include a pair of generally rectangular side members 39 with handles 40 for ease of lifting and portability.

The hood 26 is oversized so that when it is lowered onto the cooking vessel, it overlaps it so as to cause gaps of about 1 inch between the top edge of the cooking vessel and the rear edge of the hood 26 and gaps of about ½ inch between the top edge of the cooking vessel and the side edges of the hood 26. This allows smoke to escape from the hood while nonetheless allowing the smoke to season the food. As will be described below in more detail, these gaps also function to provide an outlet for the convection draught set up by air inlet 50.

Figure 4:
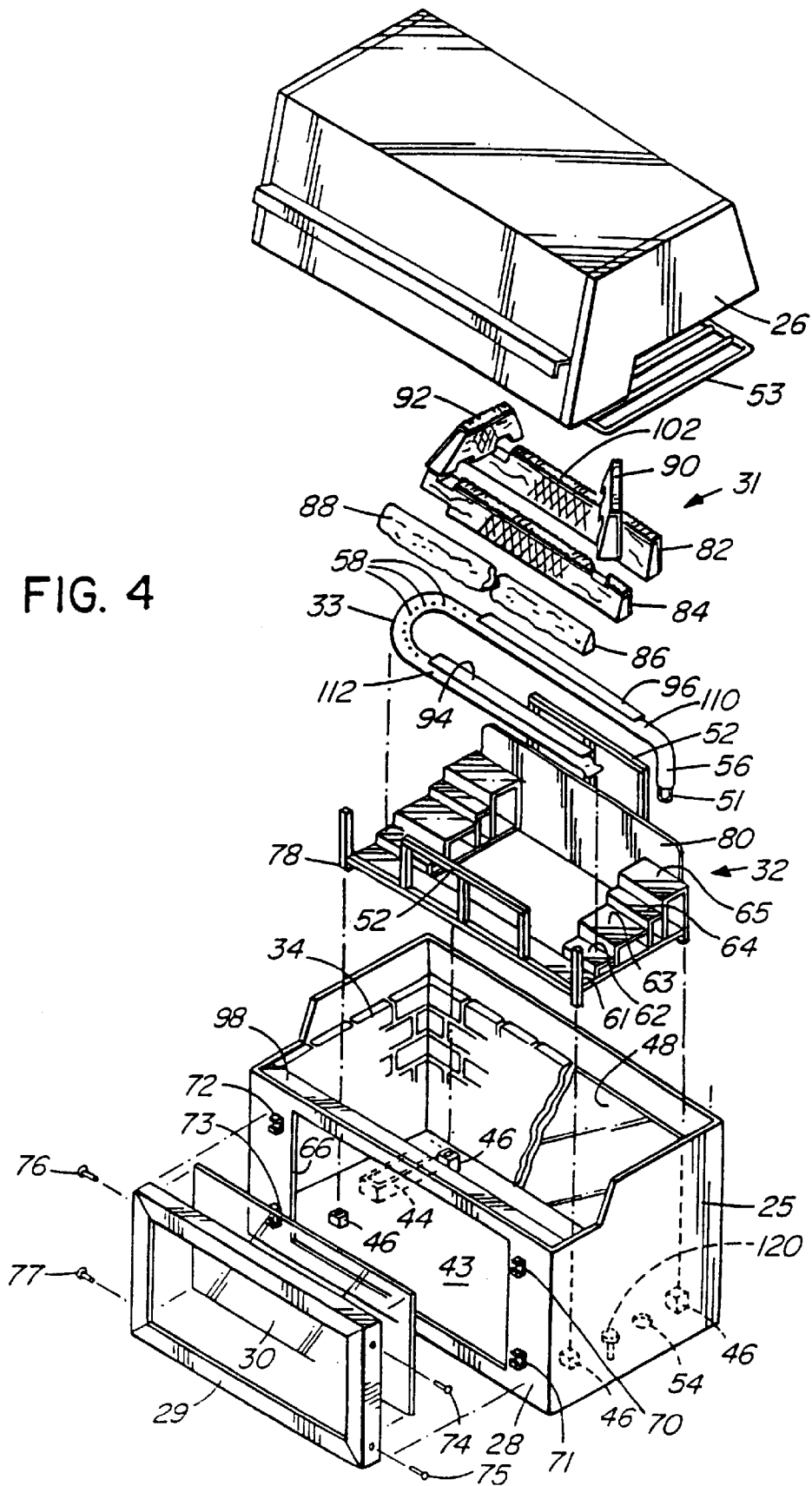
FIG. 4 is an exploded perspective view of the cooking vessel, hood and associated imitation log set, burner and log set tray according to the invention.
Figure 5:
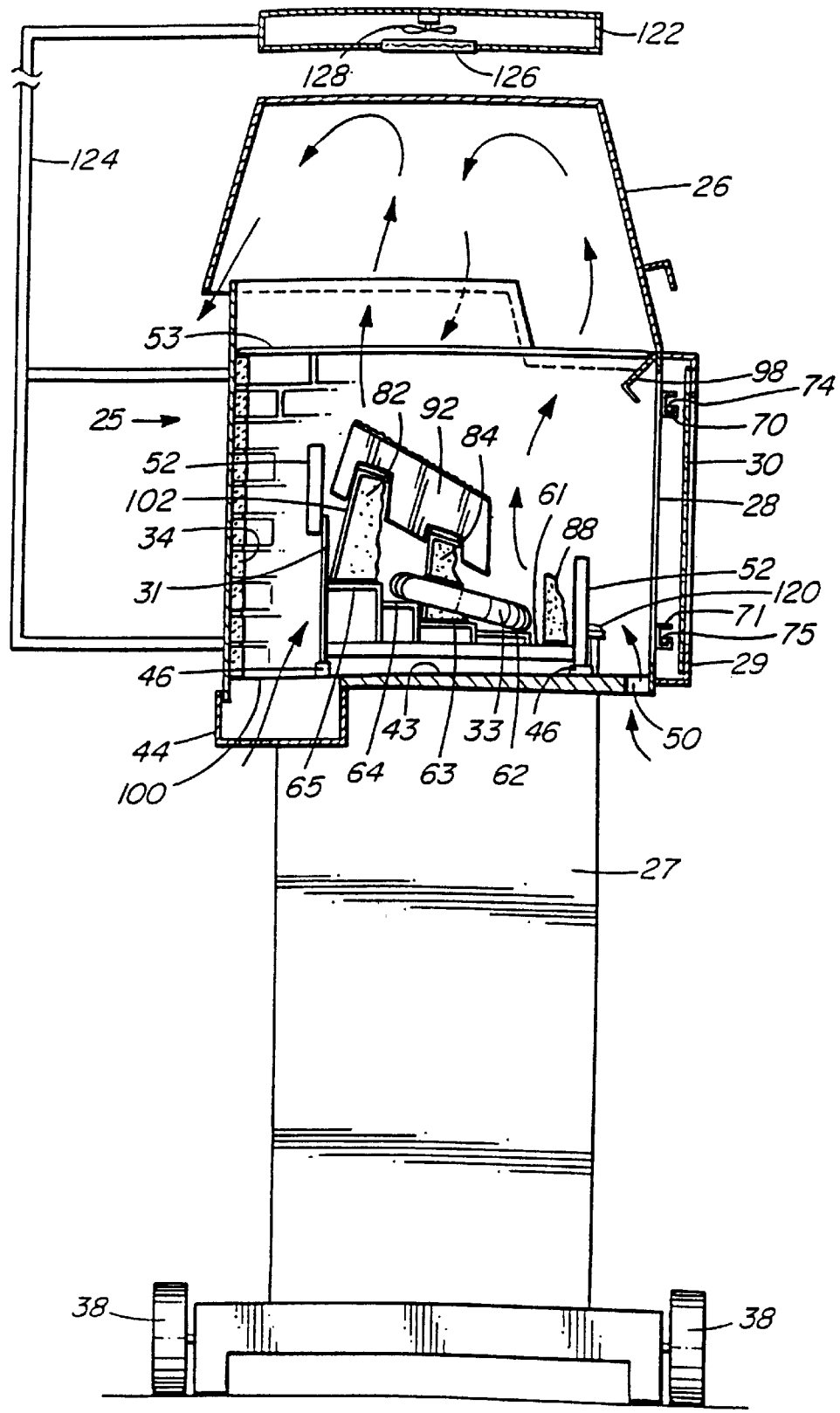
FIG. 5 is a side sectional view of the fireplace-barbecue according to the invention showing the air circulation path.
Figure 7:
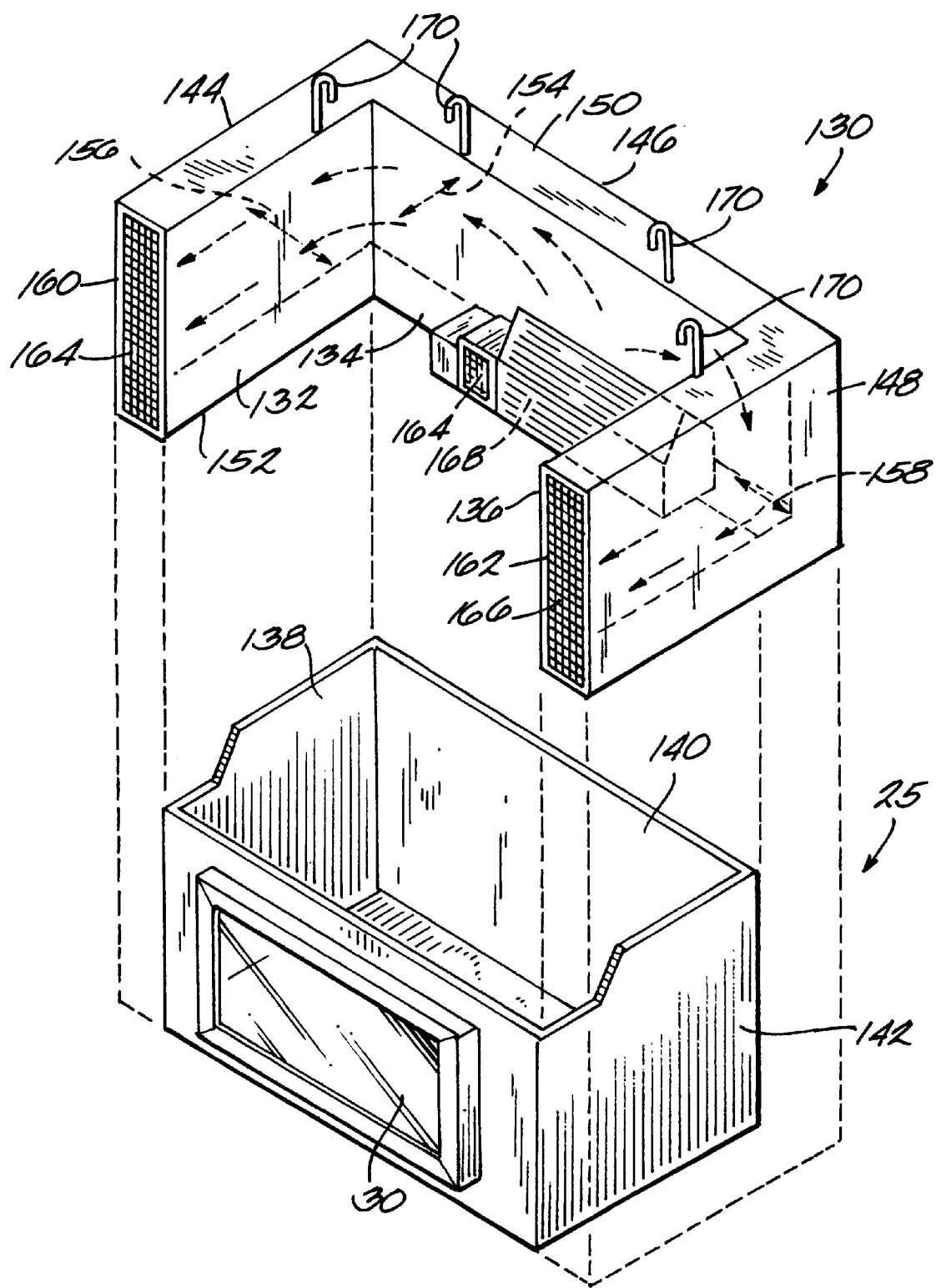

Referring generally to FIGS. 1, 4 and 5, the front wall 28 of the cooking vessel 25 includes a rectangular opening 66. Eyelets 70, 71, 72 and 73 are provided adjacent the top and bottom edges of the opening 66. A high temperature rated ceramic viewing glass 30 is set in a metal frame 29. The top and bottom edges of the frame 29 include projections 74, 75, 76 and 77 (which are screws in the preferred embodiment) located so as to allow them to be removably seated in the eyelets 70, 71, 72 and 73. The viewing glass 30 and its associated frame 29 thereby form a removable window to permit direct frontal viewing of the contents of the cooking vessel 25. Windows may also be provided in the sides of the cooking vessel, particularly if the imitation logs or other objects are suitably arranged for such viewing.

The floor 43 of the cooking vessel 25 is continuously sloped (preferably both front to back and from side to side) towards an open top grease trap receptacle 44 hanging down from a corner of the floor 43. The entire sloped vessel floor 43 acts as a tapered grease collector. A removable tray (not shown) is provided within the receptacle 44 to allow the disposal of accumulated grease.

The interior components of the cooking vessel 25 include a log grate 32, a six piece decorative refractory imitation log set 31, and a goose-necked, U-shaped burner tube 33.

Log grate 32 is formed as a series of steps 61, 62, 63, 64, 65 which serve as support surfaces for both the log set 31 and the burner 33. Burner 33 is formed such that its two elongated sections 110, 112 are at different heights so as to allow the burner to be seated on steps 62 and 64 when the burner is lowered onto the log grate 32. Steps 62 and 64 are substantially shorter in depth than steps 61, 63 and 65 and are of a depth slightly greater than the diameter of the burner sections 110, 112.

The cooking vessel floor 43 includes four hollow corner floor posts 46 of varying heights to compensate for the sloping of the vessel floor 43 and to provide level support points in which to rest base posts 78 of the log grate 32. Posts 78 are hollow and are sized to fit snugly into floor posts 46 to ensure consistent and level positioning of the log grate 32 within the cooking vessel.

Front and rear grate bars 52 on the log grate 32 provide decorative realism and act as convenient handles to lift the grate out of its corner post receptacles 46, for example for cleaning. Log grate 32 also includes a back plate 80. The log grate 32 is made slightly narrower than the width of the cooking vessel 25 so as to allow the downwardly extending neck of the burner 33 to extend through a collared leak-proof opening 54 provided in the vessel floor 43. This allows the burner's primary air shutter 51 to extend below the cooking vessel 25 where it is connected to a control knob (not shown) which allows the user to select between a blue flame for cooking purposes and a yellow tipped flame for viewing pleasure.

A log set 31 consists of 6 imitation log pieces made of a refractory blend specially suited to this application. The blend and method of making the imitation log pieces is described below. Imitation log pieces 82, 84 are sized and shaped to have a realistic look and to enable them to be seated on the uppermost and middle steps 65 and 63 respectively of log grate 32. Two other log pieces 86, 88 are intended to be placed roughly end to end across lowermost step 61. Two twig pieces 90, 92 are shaped to be snugly seated over log pieces 82, 84.

Log piece 84 is shorter than the length of burner 33 so that log piece 84 can be lifted upward from the grate 32 and through the loop of burner 33. As burner 33 is otherwise seated on steps 62 and 64 which are unoccupied by any log pieces, burner 33 can also be removed from the log grate 32 by simply removing twig pieces 90, 92, disengaging the neck of the burner from the gas inlet and lifting the burner directly upwards.

The gas outlet ports 58 of the burner 33 are angularly displaced from the top of the burner tube so as to direct the flame toward the log pieces. In addition, elongated deflectors 94, 96 are provided across the top of the elongated sections of the burner 33 to both ricochet the flame toward the log pieces and to protect the burner ports from becoming clogged with dripping grease or food particles. The gas outlet ports along the curved portion of the burner are protected from grease drippings by ensuring that twigs 90, 92 are positioned over the ports. This is assured by notches in the simulated logs that cause the twigs 90, 92 to fit snugly onto the underlying logs. The ports along the curved portion serve as a flame runner from the rear to the front of the burner tube 33.

Figure 6:
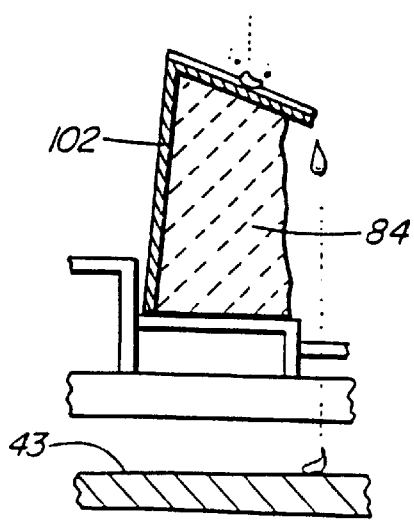
FIG. 6 is a side elevation of a grease deflector cap according to the preferred embodiment of the invention; and, FIG. 7 is a perspective view of a removable heat exchanger in accordance with the invention.

Elongated, removable deflector caps 102 are also provided along each of the logs and twigs 82, 84, 90, 92 of the refractory. An example of a deflector cap 102 is provided in FIG. 6. The deflector caps 102 extend at least the width of the logs to prevent contact of dripping grease with the refractory by redirecting the grease so that it drips beyond the surface of the log 84 onto the vessel floor 43. The deflector caps 102 may be selectively removed to allow colourful flare-ups caused by the effect of dripping grease on the heated logs.

Preferably, the interior rear and side walls of the cooking vessel 25 are lined with either refractory imitation brick panels 34 (made of the same refractory blend as the imitation logs) to add realism to the fireplace look of the vessel. In FIG. 4 only a small section of panel 34 is shown for illustration purposes. Alternatively the panels may consist of corner-angled anodized reflective chrome or brass anodized aluminum liners 48 which give the visual effect of magnifying and multiplying the flames, and which radiate additional heat toward the front of the fireplace-barbecue. An angled metal deflector above and across the width of the aforesaid liners prevents drippings from soiling the liners.

Below the top edge of the front of the cooking vessel, there is provided an inwardly directed deflector 98 (best seen in FIG. 5) comprising an angular metal plate extending at least the width of the viewing glass 30 and beyond the combustion air inlet 50 (described below). Deflector 98 causes cooking food drippings to drop past the viewing glass 30 and onto the sloped vessel floor 43. This keeps the viewing window clean of drippings.

A removable cooking grid 53 is seated on flanges near the top of the cooking vessel and covers the log set, burner and log grate assembly. The hood 26 has a heat thermometer 35 located above the wooden hood handle 36.

It will be appreciated that the cooking vessel components are removable for replacement or cleaning purposes. Firstly, the cooking grid 53 is removed from the top of the cooking vessel 25. Next, the two twig pieces 90, 92 are lifted out. This allows the burner tube's 33 goose-necked venturi 56 to be freely lifted up and out of opening 54 where it is normally inserted over the gas inlet orifice (not shown). This frees the one-piece burner 33 and allows the log grate 32 to be removed with the remaining logs intact. Lastly, the optional brick or aluminum liners are removed which leaves the cooking vessel an empty shell.

An aspect of the invention is the air circulation within the cooking vessel 25 and hood 26 which is illustrated in the cross-sectional drawing of FIG. 5. Below the viewing glass 30 is an air inlet 50 which extends across the full width of the viewing glass 30 and induces a combustion draught that pulls air movement toward the burner tube 33 and away from the viewing glass 30. The grease trap receptacle 44 in the rear corner of the cooking vessel sits beneath an air inlet 100 which creates a cross draught within the cooking vessel 25 and hood 26. This accelerates the air movement that allow the smoky by-products from cooking to escape through the overlapping rear and side gaps between the hood 26 and the upper edges of the cooking vessel 25 before they can descend to cause a smoky haze on the viewing glass 30. Deflector 98 is also sized to ensure that it covers inlet 50 to prevent drippings from the hood from falling into the inlet 50.

As will be appreciated by reference to FIG. 5, the viewing glass 30 has the advantage of allowing the user to visually observe the underside of the cooking grid 53 to see whether the cooking food is starting to overburn or overchar on the flame side of the food without having to open the hood 26 repeatedly and turn the food over for observation and to thereby lose the heat which has built up under the hood.

An optional feature of the invention is designed to allow the fireplace-barbecue to used indoor. In order to assure that the monoxide levels do not reach unsafe levels, there may be provided an oxygen depletion sensor 120 in the vicinity of the burner 33. Such oxygen depletion sensors are commercially available. Sensor 120 is attached to a gas valve (not shown) such that the supply of gas is interrupted if an insufficient concentration of oxygen is present in the combustion air drawn from the room, in accordance with regulatory safety standards for unvented gas log burning units.

In order to minimize the effect of smoke and fumes indoor, a filter compartment 122 is mounted on supports 124 extending upward from the back of the cooking vessel. Filter compartment 122 includes a filter 126 and an electric fan 128. The compartment 122 is mounted high enough above the hood 26 to allow the hood to be opened without obstruction. Preferably filter compartment 122 includes a battery to enable the fan to be operated during power interruption.

A removable fan-driven heat exchanger may also be used to direct warm air toward the front of the unit. This provides a useful complement to the visual aspect of the flame as seen through viewing glass 30. The heat exchanger 130 includes inner walls 132, 134 and 136 which are arranged so as to be substantially in contact with the outside of walls 138, 140 and 142 of the cooking vessel 25. A second series of walls 144, 146, and 148 are spaced from inner walls 132, 134 and 136 and the resulting space is closed by a top wall 150 and a bottom wall 152. The spaces between the walls of the heat exchanger define a rear chamber 154 and two side chambers 156, 158. The front ends 160, 162 of the side chambers 156, 158 are covered by screens 164, 166 to prevent the ingress of material into the chambers.

An air inlet 164 is provided in the floor of rear chamber 154. A fan and associated motor 168 are disposed over the air inlet so as to draw air into the exchanger from air inlet 164 and to vent the air through the rear and side chambers and out towards the front of the cooking vessel through screens 164, 166. An electric cord (not shown) extends from the motor through the rear wall 146 of the heat exchanger. Alternatively, the motor may be driven by replaceable batteries, in which case an access door is provided at the rear of the heat exchanger.

A plurality of hooks 170 are disposed about the interior walls 132, 134 and 136 of the heat exchanger to allow the heat exchanger to be releasably mounted on the upper edges of the walls 138, 140 and 142 of the cooking vessel.

Alternatively, the heat exchanger may be retained on the cooking vessel by means of screws fastened through brackets extending upwards from the inner walls of the heat exchanger and through the side walls of the cooking vessel (not shown).

In operation, cool air is drawn from the area beneath the cooking vessel into the air inlet. When the cooking vessel is in use, the exterior walls of the cooking vessel will heat the interior walls of the heat exchanger thereby heating the air passing through the rear and side chambers. Warm air is thereby supplied through the front of the exchanger and is urged by the operation of the fan towards the front of the cooking vessel.

A further feature of the invention is the use of imitation fireplace logs which minimize flare-ups of grease, and high heat absorption to vaporize grease drippings as thoroughly as possible, and which glow when heated to simulate real burning wood. According to the invention, a refractory blend for producing such imitation logs consists of procuring a blend comprising between 30% to 50% by weight of amorphous mineral silicate (known as "perlite" of "vermiculite"), 40% to 60% by weight high temperature cement and 5% to 10% by weight aggregate. Those elements are blended and a ratio of 55% to 65% by weight of blend and 35% to 45% by weight of water are blended to produce a slurry.

The resulting slurry is poured into rubberized firewood, coals or other molds. The molds are covered with wetted covers and are allowed to set for about 4 to 5 hours at room temperature. The product is then demolded and is immersed in water for up to twenty-four additional hours to complete the hydration cycle. The product can then be air dried. Alternatively the product can be kiln dried faster in a timed scale of heat increments. When cured and dried, the refractory has approximately the same weight as the dry blend.

The resulting refractory objects glow when subjected to flame. They are also about half the weight of concrete, possess a solid texture throughout, are resistant to cracking under intense heat or hot grease drippings, and tend to produce a rainbow of flare-up flaming colours under the effect of dripping grease due to their high heat absorption.

In order to further minimize grease build-up on their surface the uppermost portions of the imitations logs are shaped so as to avoid pools in which the grease might accumulate and to provide grooves or slopes to direct the greases downward from the surface of the logs.

The preferred embodiment of the invention has been described in relation to a single viewing window in the front wall of the cooking vessel. However the invention also contemplates one or more viewing windows in the walls of the vessel as well as providing an arrangement of walls so as to allow bay-type viewing windows.

While the invention has been precisely shown and described with reference to a preferred embodiment thereof, it will be understood by those skilled in the art that various changes in form and details may be made therein without departing from the spirit and scope of the invention.

What is claimed is:

1. A portable gas barbecue comprising a cooking vessel having a floor and walls extending upwardly from said floor, a gas burner and refractory disposed in said cooking vessel above said floor, a viewing window located in one of said walls of said cooking vessel and at substantially the same height above said floor of the cooking vessel as said refractory whereby to allow substantially direct lateral viewing of said refractory during operation of said barbecue, and a removable heat exchanger comprising:

a plurality of inner and outer walls defining at least one chamber between them, said chamber including at least one opening toward the front of the cooking vessel;
 a fan located within said chamber;
 an air inlet in said exchanger;
 retaining means for selectively mounting said heat exchanger on said cooking vessel walls; and
 said inner walls of said heat exchanger being configured such that when said heat exchanger is mounted on said cooking vessel walls, said inner walls of said heat exchanger are substantially in contact with said cooking vessel walls.

2. A removable heat exchanger for use in association with a barbecue having a cooking vessel with a plurality of side walls, said exchanger comprising:

a plurality of inner and outer walls defining at least one chamber between them, said chamber including at least one opening toward the front of the cooking vessel;
 a fan located within said chamber;
 an air inlet in said exchanger;
 means for selectively mounting said heat exchanger on said cooking vessel walls;
 said inner walls of said heat exchanger being configured such that when said heat exchanger is mounted on said cooking vessel walls, said inner walls of said heat exchanger are substantially in contact with said cooking vessel walls.

3. A portable gas barbecue according to claim 1 wherein said retaining means comprises a plurality of hooks disposed near the top edge of said inner walls and adapted to extend over the upper edge of the walls of the cooking vessel.

4. A heat exchanger according to claim 2 wherein said means for selectively mounting said heat exchanger on said cooking vessel walls comprises a plurality of hooks disposed near the top edge of said inner walls and adapted to extend over the upper edge of the walls of the cooking vessel.

5. A portable gas barbecue according to claim 1 wherein said retaining means comprises a plurality of brackets extending upwards from said inner walls and a corresponding plurality of screws adapted to extend through said brackets and through the side walls of said cooking vessel.

6. A heat exchanger according to claim 2 wherein said means for selectively mounting said heat exchanger on said cooking vessel walls comprises a plurality of brackets extending upwards from said inner walls and a corresponding plurality of screws adapted to extend through said brackets and through the side walls of said cooking vessel.

* * * * *